United States Patent
Samuel et al.

(10) Patent No.: US 11,010,152 B2
(45) Date of Patent: May 18, 2021

(54) SYSTEMS AND METHODS TO STAGE EXTERNAL DEVICE FIRMWARE FOR AN EXTERNAL DEVICE IN AN INFORMATION HANDLING SYSTEM

(71) Applicant: Dell Products L.P., Round Rock, TX (US)

(72) Inventors: Bala Ponraj Samuel, Round Rock, TX (US); Steven A. Downum, Pflugerville, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/054,756

(22) Filed: Aug. 3, 2018

(65) Prior Publication Data

US 2020/0042303 A1 Feb. 6, 2020

(51) Int. Cl.
*G06F 9/44* (2018.01)
*G06F 8/65* (2018.01)
*G06F 8/71* (2018.01)
*H04L 12/24* (2006.01)
*G06F 9/4401* (2018.01)
*G06F 9/455* (2018.01)
(Continued)

(52) U.S. Cl.
CPC .............. *G06F 8/65* (2013.01); *G06F 8/71* (2013.01); *G06F 9/4411* (2013.01); *G06F 9/45558* (2013.01); *H04L 41/06* (2013.01); *H04L 41/0893* (2013.01); *H04L 43/10* (2013.01); *G06F 2009/45579* (2013.01); *H04L 67/34* (2013.01)

(58) Field of Classification Search
CPC .......... G06F 8/65; G06F 8/71; G06F 9/45558; G06F 9/4411; G06F 2009/45579; H04L 41/06; H04L 41/0893; H04L 43/10; H04L 67/34

See application file for complete search history.

(56) References Cited

U.S. PATENT DOCUMENTS 8,555,273 B1 * 10/2013 Chia .................. G06F 8/654
717/173
8,677,097 B1 * 3/2014 Nemazie .............. G06F 9/4411
711/170
(Continued)

*Primary Examiner* — Lewis A Bullock, Jr.
*Assistant Examiner* — Tina Huynh
(74) *Attorney, Agent, or Firm* — Baker Botts L.L.P.

(57) ABSTRACT

Systems and methods to stage firmware capsule package for an external device in a firmware client system. The firmware client system may include a basic input/output system (BIOS) and an operating system (OS). The BIOS may create a virtual device. The OS may download a virtual device driver package associated with the virtual device from an update service. The virtual device driver package may include a first virtual device driver and a first external device firmware. The OS may also install the first virtual device driver of the virtual device driver package, stage the first external device firmware on a storage device, and execute the first virtual device driver. The first virtual device driver may, when a first external device associated with the first external device firmware is available, deliver the first external device firmware to the first external device using an update firmware mechanism.

20 Claims, 4 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 2004/0194081 A1* | 9/2004 | Qumei | G06F 8/65 717/173 |
| 2007/0169081 A1* | 7/2007 | Zhao | G06F 8/65 717/168 |
| 2007/0169129 A1* | 7/2007 | Polivy | G06F 9/44505 719/327 |
| 2009/0178033 A1* | 7/2009 | Challener | G06F 9/4411 717/168 |
| 2014/0007073 A1* | 1/2014 | Cavalaris | G06F 8/654 717/172 |
| 2016/0170736 A1* | 6/2016 | Landry | G06F 11/1433 717/168 |
| 2017/0192770 A1* | 7/2017 | Ujiie | G06F 8/654 |
| 2018/0300166 A1* | 10/2018 | Liguori | G06F 9/45558 |
| 2019/0205114 A1* | 7/2019 | Hamakawa | G06F 8/65 |
| 2019/0354366 A1* | 11/2019 | Lam | G06F 21/572 |

* cited by examiner

SYSTEMS AND METHODS TO STAGE EXTERNAL DEVICE FIRMWARE FOR AN EXTERNAL DEVICE IN AN INFORMATION HANDLING SYSTEM

BACKGROUND

Field of the Disclosure

This disclosure relates generally to information handling systems and, more particularly, to systems and methods to stage external device firmware for an external device in an information handling system.

Description of the Related Art

As the value and use of information continues to increase, individuals and businesses seek additional ways to process and store information. One option available to users is firmware client systems. A firmware client system generally processes, compiles, stores, and/or communicates information or data for business, personal, or other purposes thereby allowing users to take advantage of the value of the information. Because technology and information handling needs and requirements vary between different users or applications, firmware client systems may also vary regarding what information is handled, how the information is handled, how much information is processed, stored, or communicated, and how quickly and efficiently the information may be processed, stored, or communicated. The variations in firmware client systems allow for firmware client systems to be general or configured for a specific user or specific use such as financial transaction processing, airline reservations, enterprise data storage, or global communications. In addition, firmware client systems may include a variety of hardware and software components that may be configured to process, store, and communicate information and may include one or more computer systems, data storage systems, and networking systems.

SUMMARY

In one embodiment, a disclosed firmware client system may include a processor, a memory, and a basic input/output system (BIOS) stored in the memory and executable by the processor. The BIOS may create a virtual device. The firmware client system may also include an operating system (OS) stored in the memory and executable by the processor. The OS may download a virtual device driver package associated with the virtual device from an update service. The virtual device driver package may include a first virtual device driver and a first external device firmware. The OS may also install the first virtual device driver of the virtual device driver package, stage the first external device firmware on a storage device coupled to the firmware client system, and execute the first virtual device driver. The first virtual device driver may, when a first external device associated with the first external device firmware is available, deliver the first external device firmware to the first external device using an update firmware mechanism.

In a number of the disclosed embodiments of the firmware client system, the first virtual device driver may also, when the first external device firmware is being delivered to the first external device, display a user interface that may alert a user that a second external device firmware installed on the first external device may be being updated to the first external device firmware using a user-mode device driver associated with the virtual device.

In a number of the disclosed embodiments of the firmware client system, the delivery of the first external device firmware to the first external device may be scheduled at a first time based on a rules-based policy set by an administrator of the firmware client system.

In a number of the disclosed embodiments of the firmware client system, the delivery of the first external device firmware to the first external device may be based on a rules-based policy set by an administrator of the firmware client system.

In a number of the disclosed embodiments of the firmware client system, the delivery of the first external device firmware to the first external device may be based on a version of the first external device firmware and the version of a second external device firmware installed on the first external device.

In a number of the disclosed embodiments of the firmware client system, the first virtual device driver may determine that the first external device is available by polling for the first external device.

In a number of the disclosed embodiments of the firmware client system, the first virtual device driver may install an event handler that may detect when the first external device becomes available.

In a number of the disclosed embodiments of the firmware client system, prior to the download of the virtual device driver package, publish the virtual device driver package to the update service.

In a number of the disclosed embodiments of the firmware client system, the OS may, prior to the download of the virtual device driver package, determine that the update service has the virtual device driver package.

In a number of the disclosed embodiments of the firmware client system, the OS may comprise a Microsoft Windows operating system, the update service may comprise a Microsoft Windows Update service, and the update firmware mechanism may comprise a unified extensible firmware interface (UEFI) Microsoft Windows update capsule mechanism.

In a second embodiment, a disclosed method may include creating, by a basic input/output system (BIOS) of a firmware client system, a virtual device and downloading, by an operating system (OS), a virtual device driver package associated with the virtual device from an update service. The virtual device driver package may include a first virtual device driver and a first external device firmware. The method may also include installing, by the OS, the first virtual device driver of the virtual device driver package, staging, by the OS, the first external device firmware on a storage device coupled to the firmware client system, executing, by the OS, the first virtual device driver, and when a first external device associated with the first external device firmware is available, delivering, by the first virtual device driver, the first external device firmware to the first external device using a UEFI firmware capsule update mechanism.

In a number of the disclosed embodiments of the method, the method may also include, when the first external device firmware may be delivering the first external device firmware to the first external device, displaying a user interface that may alert a user that a second external device firmware installed on the first external device may be being updated to the first external device firmware using a user-mode device driver associated with the virtual device.

In a number of the disclosed embodiments of the method, delivering the first external device firmware to the first external device may be scheduled at a first time based on a rules-based policy set by an administrator of the firmware client system.

In a number of the disclosed embodiments of the method, delivering the first external device firmware to the first external device may be based on a rules-based policy set by an administrator of the firmware client system.

In a number of the disclosed embodiments of the method, delivering the first external device firmware to the first external device may be based on a version of the first external device firmware and a version of a second external device firmware installed on the first external device.

In a number of the disclosed embodiments of the method, the first virtual device driver may determine that the first external device associated with the first external device firmware is available by polling for the first external device.

In a number of the disclosed embodiments of the method, the method may also include installing, by the first virtual device driver, an event handler to detect when the first external device becomes available.

In a number of the disclosed embodiments of the method, the method may also include, prior to downloading the virtual device driver package, publishing the virtual device driver package to the update service.

In a number of the disclosed embodiments of the method, the method may also include, prior to downloading the virtual device driver package, determining that the update service has the virtual device driver package.

In a number of the disclosed embodiments of the method, the OS may comprise a Microsoft Windows operating system, the update service may comprise a Microsoft Windows Update service, and the update firmware mechanism may comprise a unified extensible firmware interface (UEFI) Microsoft Windows update capsule mechanism.

BRIEF DESCRIPTION OF THE DRAWINGS

For a more complete understanding of the present invention and its features and advantages, reference is now made to the following description, taken in conjunction with the accompanying drawings, in which.

Figure 1:
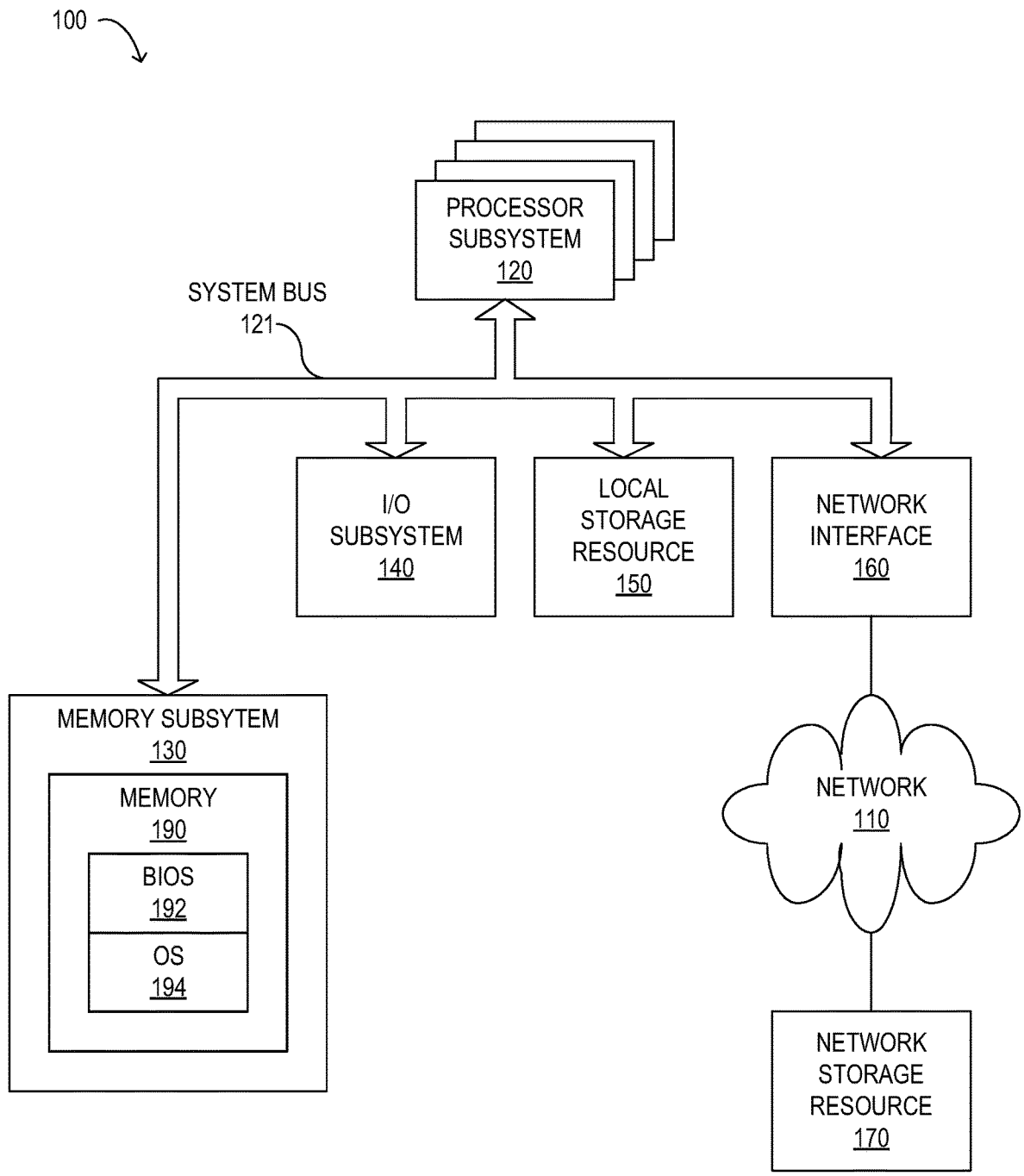
FIG. 1 is a block diagram of selected elements of an embodiment of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. As shown in FIG. 1, memory subsystem 130 may include a memory 190 having a basic input/output system (BIOS) 192 and an operating system (OS) 194.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

BIOS 192 may comprise firmware executable by a processor of processor subsystem 120 for performing various tasks including creating virtual devices and updating external device firmware associated with the virtual devices during the booting process and power-on startup. OS 194 may comprise instructions executable by a processor of processor subsystem 120 for performing various functions during the booting process, power-on startup, and runtime.

A firmware management system for updating firmware for external devices may utilize an update service such as Microsoft Windows Update service. The Microsoft Windows Update service utilizes a Windows capsule update mechanism to update external device firmware on an external device. Windows capsule update mechanism depends on an extensible firmware interface system resource table (ESRT) and utilizes data within the ESRT to update the external device firmware on the external device. The ESRT data is determined at system boot time of a client system and ESRT data remains static after completion of the system boot. The ESRT data may comprise a boot loader or a kernel image for each installed operating system (OS), device driver files for external devices present in the client system and used by the client system firmware at system boot time, system utility programs intended to run before and OS is booted, and data files such as data files. Since the ESRT data remains static after the system boot, a firmware update failure may occur if an external device is not available when the ESRT is polled by a plug-and-play (PNP) manager or the version of the external device firmware is only updated after a system boot or re-boot, which may result in a firmware version mismatch during polling. As such, updating external device firmware for an external device utilizing the Windows Update is problematic, as the external device may be unavailable and will be passed up for a firmware update by the Windows Update. A standalone desktop application to update the external device firmware is also not viable because Microsoft Windows level 10s OS prohibits such applications to run.

As will be described in further detail herein, the inventors of the present disclosure have discovered systems and methods to stage external device firmware for an external device in an information handling system. In the present solution, a firmware management system may utilize a device driver update mechanism, such as the Microsoft Windows Driver update mechanism, to stage external device firmware for an associated external device. A virtual device driver is utilized to manage and stage the Windows Update service external device firmware update. A virtual device is created by a BIOS of a firmware client system of the firmware management system and the virtual device driver is associated to this virtual device. The virtual device driver loads every time the firmware client system boots up. The external device firmware is packaged with this virtual device driver. When a new version of the external device firmware is released to a firmware server system, the new version of the external device firmware is package to a new version of the virtual device driver and submitted to the Windows Update service. When the OS of the firmware client system detects a new version of the virtual device driver on the Windows Update service, the OS downloads the new version of the virtual device driver and the new version of the external device firmware embedded within the new virtual device driver. When the download completes, the OS updates the virtual device driver to the new virtual device driver, installs the new virtual device driver, stages the new external device firmware on a storage device coupled to the firmware client system for future installation, and runs the new virtual device driver. The new virtual device driver may install an event handler to detect an associated external device. When the external device is detected and is available, the new virtual device driver will deliver the new external device firmware to the external device using the universal extensible firmware interface (UEFI) to update the firmware. The disclosed firmware management system is dynamic and is independent of the state of the ESRT. The firmware management system provides a way for a firmware client system to obtain the latest external device firmware for an external device and then apply the firmware update when the external device is available later. The firmware management system also allows an administrator of the firmware client system to schedule a firmware update at a specific time based on a rules-based policy set by the administrator or deliver the new external device firmware based on this rules-based policy.

Figure 2:
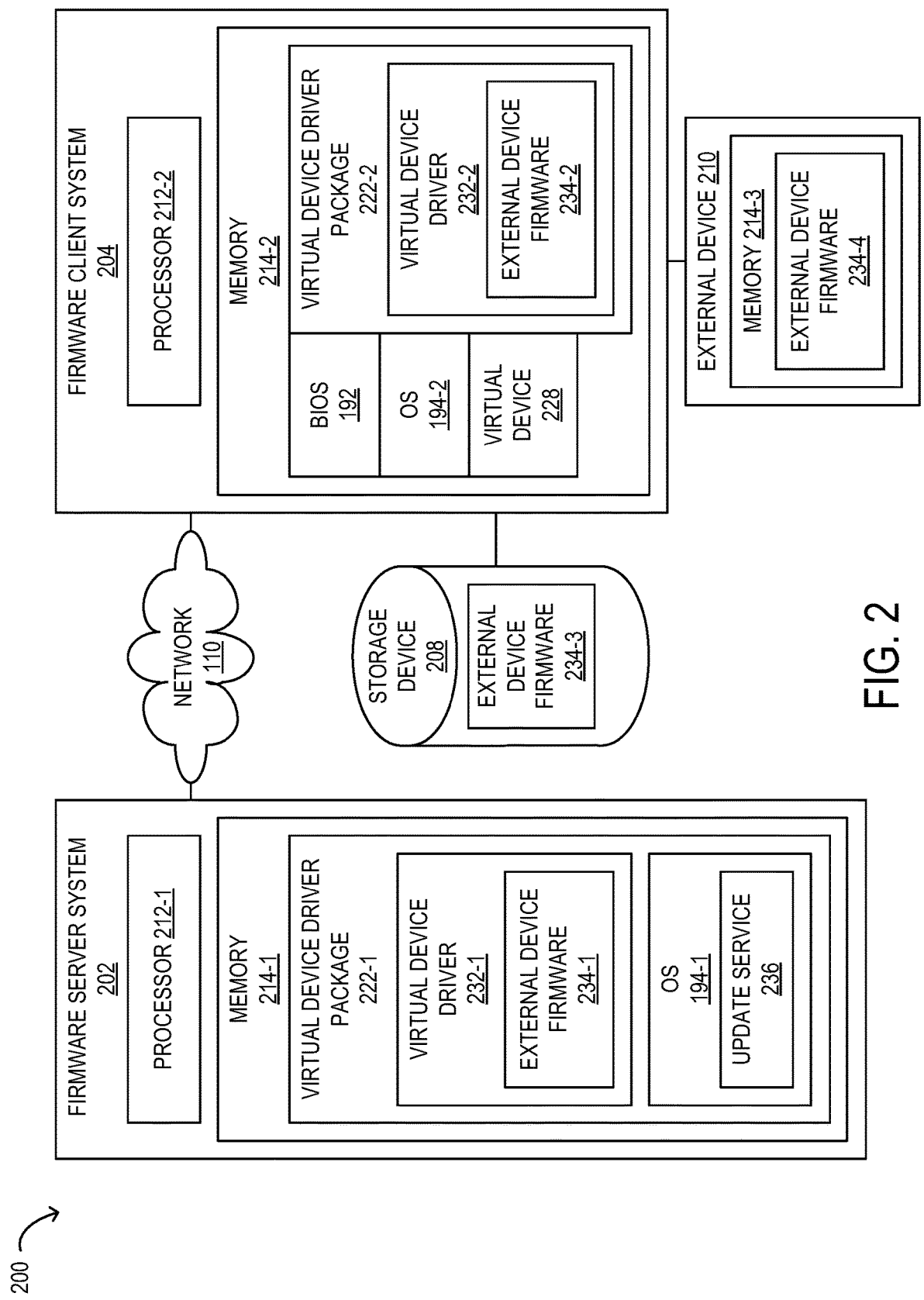
FIG. 2 is a block diagram of selected elements of an embodiment of an exemplary firmware management system for staging external device firmware for an external device.

Turning now to FIG. 2, a block diagram depicting selected elements of an embodiment of an exemplary firmware management system 200 for staging external device firmware for an external device. As shown in FIG. 2, components of firmware management system 200 may include, but are not limited to, a firmware server system 202, a firmware client system 204, a storage device 208, an external device 210, and network 110. Each of firmware server system 202 and firmware client system 204 may comprise information handling system 100. Firmware server system 202 and firmware client system 204 may be coupled to each other via network 110. Storage device 208 may be coupled to firmware client system 204 and external device 210 may be coupled to firmware client system 204.

Firmware server system 202 may include a processor 212-1 and a memory 214-1. Memory 214-1 may include a virtual device driver package 222-1 and OS 194-1. OS 194-1 may be executable by processor 212-1. In one or more embodiments, OS 194-1 may comprise a Microsoft Windows operating system, a Microsoft Windows 10 S operating system, or another type of operating system. OS 194-1 may include an update service 236 which may be executable by processor 212-1. In one or more embodiments, update service 236 may comprise a Microsoft Windows Update service. Virtual device driver package 222-1 may include a virtual device driver 232-1 and external device firmware 234-1 embedded within virtual device driver 232-1.

Firmware client system 204 may include a processor 212-2 and a memory 214-2. Memory 214-2 may include BIOS 192, OS 194-2, a virtual device driver package 222-2, and a virtual device 228. BIOS 192 may be stored in memory 214-2 and may be executable by processor 212-2. Virtual device driver package 222-2 may include a virtual device driver 232-2 and external device firmware 234-2 embedded within virtual device driver 232-2. OS 194-2 may be stored in memory 214-2 and may be executable by processor 212-2. In one or more embodiments, OS 194-2 may comprise a Microsoft Windows operating system, a Microsoft Windows 10 S operating system, or another type of operating system. Storage device 208 may include external device firmware 234-3. External device 210 may include a memory 214-3. Memory 214-2 may include external device firmware 234-4.

During operation, a developer may develop virtual device driver 232-1 and external device firmware 234-1 on a development system (not shown). The developer may embed external device firmware 234-1 within virtual device driver 232-1. The developer may create virtual device driver package 222-1 including virtual device driver 232-1 and external device firmware 234-1 embedded with virtual device driver 232-1. The developer may publish virtual device driver package 222-1 to update service 236 of firmware server system 202.

During system boot of firmware client system 204, BIOS 192 may create virtual device 228 with a unique advanced configuration and power interface (ACPI) identification (ID) associated with virtual device 228. The virtual device 228 is added to the memory 214-2 in the form of ACPI table. During boot of OS 194-2, OS 194-2 may attach a current virtual device driver 232 (not shown) stored at memory 214-2 to virtual device 228. During operation of firmware client system 204, OS 194-2 may periodically query update service 236 of firmware server system 202 for a new virtual device driver package 222. OS 194-2 may query update service 236 based on a programmable period, which may be set to a value of 5 minutes, 5 hours, or another appropriate time period. OS 194-2 may determine whether a newer version of virtual device driver package 222 exists based on the query of update service 236. When update service 236 indicates that a newer version of virtual device driver package 222 does not exist, OS 194-2 may continue periodically querying update service 236. When update service 236 indicates that the newer version of virtual device driver package 222-1 exists, OS 194-2 may download virtual device driver package 222-1 associated with virtual device 228 from update service 236. Virtual device driver package 222-1 may be downloaded at virtual device driver package 222-2 at memory 214-2. When the download is complete, OS 192-2 may install this newer version virtual device driver 232-2 of virtual device driver package 222-2. Once the newer version of the virtual device driver 232-2 has been installed, virtual device driver 232-2 may stage the new version of external device firmware 234-2 on storage device 208 by storing external device firmware 234-2 at storage device 208. OS 194-2 may execute and run virtual device driver 232-2. Virtual device driver 232-2 may check for external device 210 associated with external device firmware 234-2 availability. When virtual device driver 232-2 determines that external device 210 is not available, virtual device driver 232-2 may continue to check for external device 210 availability. In some embodiments, virtual device driver 232-2 may check for external device 210 availability by polling external device 210. When external device 210 responds, external device 210 is available. In one or more other embodiments, virtual device driver 232-2 may install an event handler that may detect when external device 210 is coupled to firmware client system 204. When the event handler detects that external device 210 is coupled to firmware client system 204, external device 210 is available. When external device 210 is available, virtual device driver 232-2 may deliver external device firmware 234-2 to memory 214-2. At this point, external device firmware 234-2 has been staged for external device 210.

On a subsequent re-boot of firmware client system 204, BIOS 192 may read external device firmware 234-2 from memory 214-2 and update external device firmware 234-4 of external device 210 with the new external device firmware 234-2 using an update firmware mechanism. The update firmware mechanism may comprise a unified extensible firmware interface (UEFI) Microsoft Windows update capsule mechanism.

In one or more embodiments, virtual device driver 232-2 may, when external device firmware 234-2 is being delivered to external device 210, display a user interface that may alert a user that external device firmware 234-4 currently installed on external device 210 may be being updated to external device firmware 234-2 using a user-mode device driver associated with virtual device 228. In one or more embodiments, delivery of external device firmware 234-2 to external device 210 may be scheduled at a first time based on a rules-based policy set by an administrator of firmware client system 204. In one or more embodiments, delivery of external device firmware 234-2 to external device 210 may be based on a rules-based policy set by an administrator of firmware client system 204. In one or more embodiments, delivery of external device firmware 234-2 to external device 210 may be based on a version of external device firmware 234-2 and the version of external device firmware 234-4 installed on external device 210. For example, when the version of external device firmware 234-2 is newer than the version of external device firmware 234-4, external device firmware 234-2 is delivered to and installed on external device 210. When the version of external device firmware 234-2 is older than the version of external device firmware 234-4, external device firmware 234-2 is not delivered to and installed on external device 210 and the newer version of external device firmware 234-4 remains on external device 210.

Figure 3:
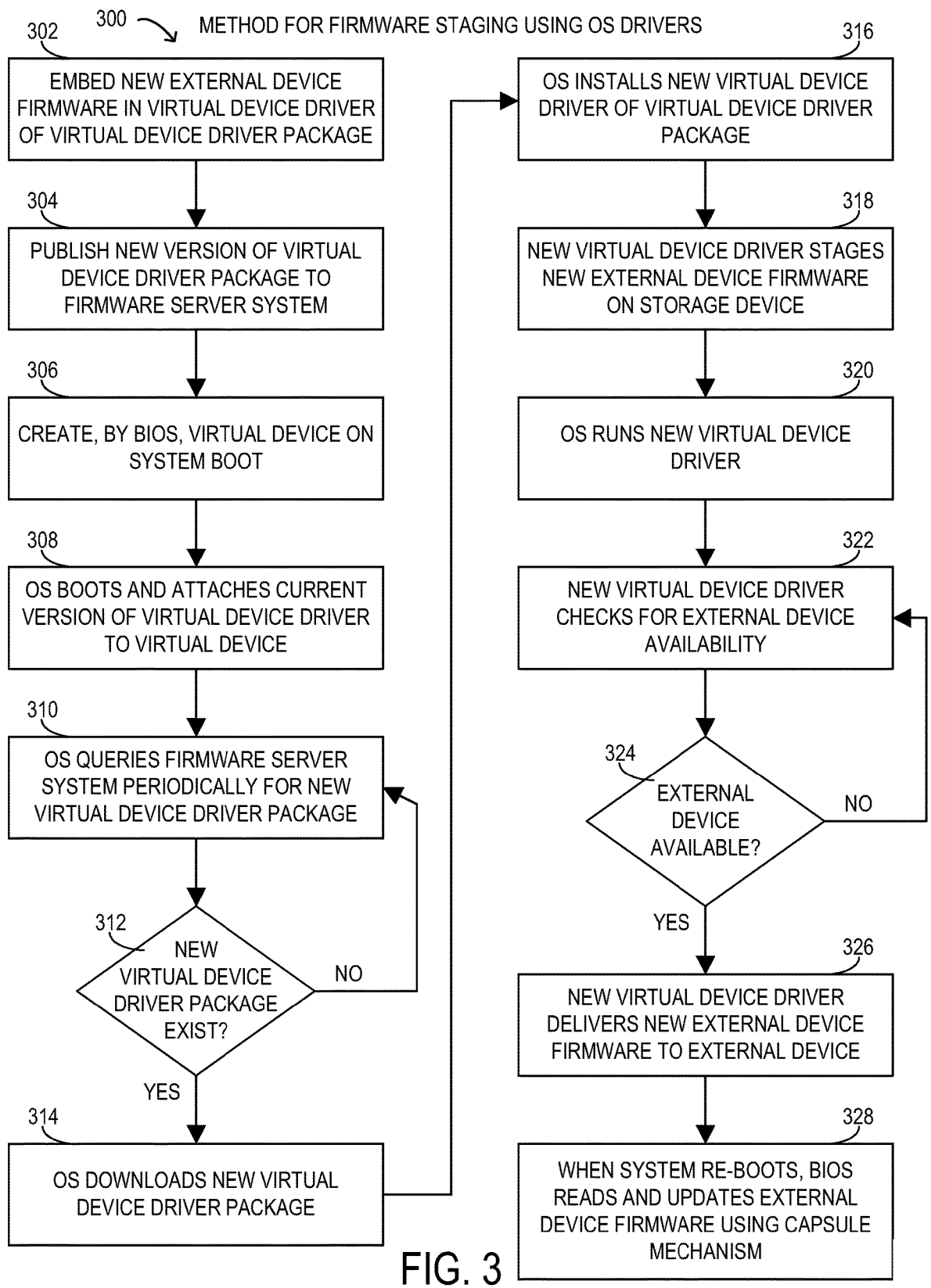
FIG. 3 is a flowchart depicting selected elements of an embodiment of a method to stage external device firmware for an external device in a firmware client system.

FIG. 3 is a flowchart depicting selected elements of an embodiment of a method 300 to stage external device firmware for an external device in a firmware client system. Method 300 may be performed by information handling system 100, firmware client system 204, firmware management system 200 previously described with reference to FIGS. 1 and 2, or another information handling system. It is noted that certain operations described in method 300 may be optional or may be rearranged in different embodiments.

Method 300 may begin at step 302, by embedding new external device firmware in a virtual device driver of a virtual device driver package. At step 304, publishing a new version of the virtual device driver package to an update service. At step 306, creating, by a BIOS, a virtual device during a system boot. At step 308, attaching, by an OS, a current version of the virtual device driver to the virtual device during booting of the OS. At step 310, querying, by the OS, the update service periodically for a new virtual device driver package. At step 312, determining whether the new device driver package exists. When the new device driver package exists, method 300 proceeds to step 314. Otherwise, method 300 loops back to step 310. At step 314, downloading, by the OS, the new virtual device driver package. At step 316, installing, by the OS, the new virtual device driver of the virtual device driver package. At step 318, staging, by the new virtual device driver, the new external device firmware on a storage device. At step 320, running, by the OS, the new virtual device driver. At step 322, checking, by the new virtual device driver, for external device availability. At step 324, determining, by the new virtual device driver, whether the external device is available. When the external device is available, method 300 proceeds to step 326. Otherwise, method 300 loops back to step 322. At step 326, delivering, by the new virtual device driver, the new external device firmware to the external device. At step 328, when the system re-boots, reading, by the BIOS, the current external device firmware from the external device, and updating the current external device firmware with the new external device firmware.

Figure 4:
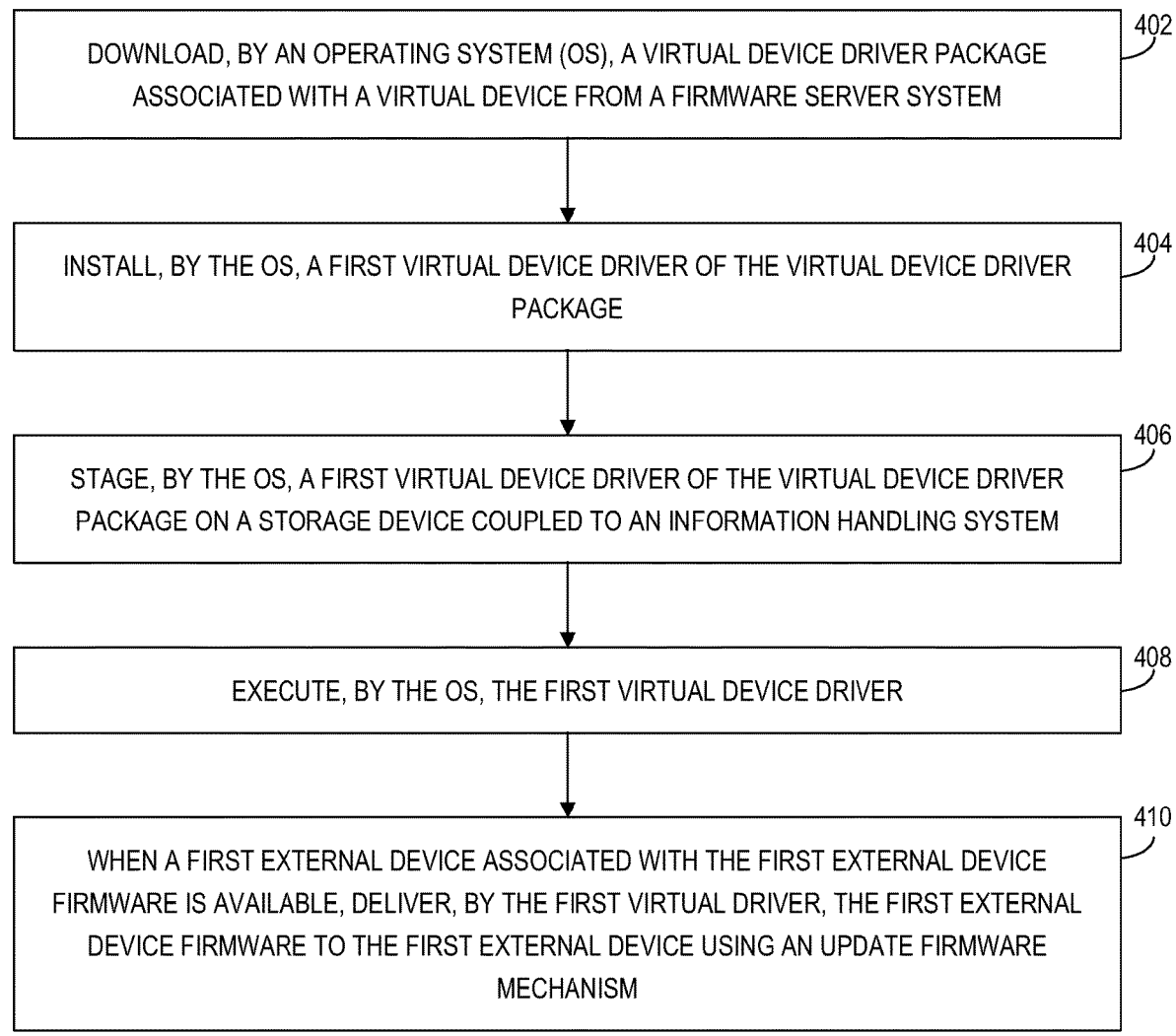
FIG. 4 is a flowchart depicting selected elements of an embodiment of a method to stage external device firmware for an external device in a firmware client system.

FIG. 4 is a flowchart depicting selected elements of an embodiment of a method 400 to stage external device firmware for an external device in a firmware client system. Method 400 may be performed by information handling system 100, firmware client system 204, firmware management system 200 previously described with reference to FIGS. 1 and 2, or another information handling system. It is noted that certain operations described in method 300 may be optional or may be rearranged in different embodiments.

Method 400 may begin at step 402, by creating, by a BIOS of a firmware client system, a virtual device. At step 404, downloading, by an OS, a virtual device driver package associated with the virtual device from an update service. The virtual device driver package may include a first virtual device driver and a first external device firmware. At step 406, installing, by the OS, the first virtual device driver of the virtual device driver package. At step 408, staging, by the OS, the first external device firmware on a storage device coupled to the firmware client system. At step 410, executing, by the OS, the first virtual device driver. At step 412, when a first external device associated with the first external device firmware is available, delivering, by the first virtual device driver, the first external device firmware to the first external device using an update firmware mechanism.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A firmware client system, comprising:
a processor;
a memory;
a basic input/output system (BIOS) stored in the memory and executable by the processor, the BIOS configured to create a virtual device; and
an operating system (OS) stored in the memory and executable by the processor, the OS configured to:
download a virtual device driver package associated with the virtual device from an update service of a firmware server system, the virtual device driver package including a first virtual device driver and a first external device firmware for a first external device associated with the firmware client system;
install the first virtual device driver of the virtual device driver package in the memory;
store the first external device firmware on a storage device coupled to the firmware client system for subsequent delivery to the first external device; and
execute the first virtual device driver;
wherein, subsequent to storing the first external device firmware on the storage device, the first virtual device driver is configured to:
determine that the first external device is not available to receive delivery of the first external device firmware;
responsive to determining that the first external device is not available to receive delivery of the first external device firmware, refrain from delivering the first external device firmware to the first external device;
determine, subsequent to determining that the first external device is not available to receive delivery of the first external device firmware, that the first external device is available to receive delivery of the first external device firmware; and
responsive to determining that the first external device is available to receive delivery of the first external device firmware, deliver the first external device firmware to the first external device using an update firmware mechanism.

2. The firmware client system of claim 1, wherein the first virtual device driver is further configured to:
when the first external device firmware is being delivered to the first external device, display a user interface to alert a user that a second external device firmware installed on the first external device is being updated to the first external device firmware using a user-mode device driver associated with the virtual device.

3. The firmware client system of claim 1, wherein the delivery of the first external device firmware to the first external device is scheduled at a first time based on a rules-based policy set by an administrator of the firmware client system.

4. The firmware client system of claim 1, wherein the delivery of the first external device firmware to the first external device is based on a rules-based policy set by an administrator of the firmware client system.

5. The firmware client system of claim 1, wherein the delivery of the first external device firmware to the first external device is based on a version of the first external device firmware and a version of a second external device firmware installed on the first external device.

6. The firmware client system of claim 1, wherein to determine whether the first external device is available to receive delivery of the first external device firmware, the first virtual device driver is configured to poll for the first external device.

7. The firmware client system of claim 1, wherein to determine whether the first external device is available to receive delivery of the first external device firmware, the first virtual device driver is further configured to:
install an event handler to detect when the first external device is coupled to the firmware client system.

8. The firmware client system of claim 1, wherein, prior to the download of the virtual device driver package, the virtual device driver package is published to the update service of the firmware server system.

9. The firmware client system of claim 1, wherein the OS is further configured to:
prior to the download of the virtual device driver package, determine that the update service has the virtual device driver package.

10. The firmware client system of claim 1, wherein the OS comprises a Microsoft Windows operating system, wherein the update service comprises a Microsoft Windows Update service, and wherein the update firmware mechanism comprises a unified extensible firmware interface (UEFI) Microsoft Windows update capsule mechanism.

11. A method, comprising:
creating, by a basic input/output system (BIOS) of a firmware client system, a virtual device;
downloading, by an operating system (OS) from an update service of a firmware server system, a virtual device driver package associated with the virtual device, the virtual device driver package including a first virtual device driver and a first external device firmware for a first external device associated with the firmware client system;
installing, by the OS in a memory of the firmware client system, the first virtual device driver of the virtual device driver package;
storing, by the OS, the first external device firmware on a storage device coupled to the firmware client system for subsequent delivery to the first external device;
executing, by the OS, the first virtual device driver; and
subsequent to storing the first external device firmware on the storage device, the first virtual device driver performing:
determining that the first external device is not available to receive delivery of the first external device firmware;
in responsive to determining that the first external device is not available to receive delivery of the first external device firmware, refraining from delivering the first external device firmware of the first external device;
determining, subsequent to determining that the first external device is not available to receive delivery of the first external device firmware, that the first external device is available to receive delivery of the first external device firmware; and
in response to determining that the first external device is available to receive delivery of the first external device firmware, delivering, by the first virtual device driver, the first external device firmware to the first external device using an update firmware mechanism.

12. The method of claim 11, wherein the method further comprises:
when the first external device firmware is delivering the first external device firmware to the first external device, displaying a user interface to alert a user that a second external device firmware installed on the first external device is being updated to the first external device firmware using a user-mode device driver associated with the virtual device.

13. The method of claim 11, wherein delivering the first external device firmware to the first external device is scheduled at a first time based on a rules-based policy set by an administrator of the firmware client system.

14. The method of claim 11, wherein delivering the first external device firmware to the first external device is based on a rules-based policy set by an administrator of the firmware client system.

15. The method of claim 11, wherein delivering the first external device firmware to the first external device is based on a version of the first external device firmware and a version of a second external device firmware installed on the first external device.

16. The method of claim 11, wherein determining that the first external device is available to receive delivery of the first external device firmware comprises the first virtual device driver polling for the first external device.

17. The method of claim 11, wherein the method further comprises:
installing, by the first virtual device driver, an event handler to detect when the first external device is coupled to the firmware client system.

18. The method of claim 11, wherein the method further comprises:
prior to downloading the virtual device driver package:
publishing the virtual device driver package to the update service of the firmware server system.

19. The method of claim 11, wherein the method further comprises:
prior to downloading the virtual device driver package:
determining that the update service has the virtual device driver package.

20. The method of claim 11, wherein the OS comprises a Microsoft Windows operating system, wherein the update service comprises a Microsoft Windows Update service, and wherein the update firmware mechanism comprises a unified extensible firmware interface (UEFI) Microsoft Windows update capsule mechanism.

* * * * *